United States Patent
Huang et al.

(10) Patent No.: US 6,946,823 B2
(45) Date of Patent: Sep. 20, 2005

(54) DELTA-SIGMA DC-TO-DC CONVERTER AND METHOD THEREOF

(75) Inventors: Kent Huang, Taoyuan (TW); Liang-Pin Tai, Tainan (TW); Hung-I Wang, Changhua (TW); Jian-Rong Huang, Hsinchu (TW); Kuo-Ping Liu, Hsinchu (TW); Yu-Fan Liao, Fengshan (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 10/846,601

(22) Filed: May 17, 2004

(65) Prior Publication Data

US 2004/0232901 A1 Nov. 25, 2004

(30) Foreign Application Priority Data

May 19, 2003 (TW) ........................................ 92113519 A

(51) Int. Cl.[7] ............................................. G05F 1/575
(52) U.S. Cl. ....................................................... 323/282
(58) Field of Search ................................. 323/280, 282, 323/284, 285, 351

(56) References Cited

U.S. PATENT DOCUMENTS

| | | | | |
|---|---|---|---|---|
| 5,912,552 A | * | 6/1999 | Tateishi | 323/285 |
| 6,580,258 B2 | * | 6/2003 | Wilcox et al. | 323/282 |
| 6,583,610 B2 | * | 6/2003 | Groom et al. | 323/288 |
| 6,791,306 B2 | * | 9/2004 | Walters et al. | 323/288 |
| 6,879,137 B2 | * | 4/2005 | Sase et al. | 323/282 |
| 2004/0232900 A1 | * | 11/2004 | Huang et al. | 323/282 |
| 2005/0057238 A1 | * | 3/2005 | Yoshida | 323/282 |

* cited by examiner

*Primary Examiner*—Adolf Berhane
(74) *Attorney, Agent, or Firm*—Rosenberg, Klein & Lee

(57) ABSTRACT

A delta-sigma DC-to-DC converter comprises a pair of high-side and low-side switches switched to convert an input voltage to an output voltage, a sense circuit to sense the output voltage of the converter to generate a feedback signal, a transconductive amplifier to amplify a difference between the feedback signal and a threshold signal to generate a differential current, a charging circuit connected with the differential current to generate a charging voltage, and a driver to compare the charging voltage with two reference signals to generate the pair of low-side and high-side driving signals.

11 Claims, 3 Drawing Sheets

DELTA-SIGMA DC-TO-DC CONVERTER AND METHOD THEREOF

FIELD OF THE INVENTION

The present invention relates generally to a power conversion apparatus and method and more particularly, to a delta-sigma DC-to-DC converter and method thereof.

BACKGROUND OF THE INVENTION

Widely applied to various electronic products, a DC-to-DC converter provides the functions of regulating the voltage level from a DC input voltage, such as boost or buck voltage conversion, and of maintaining the regulated voltage at the desired level. For example, in a computer system, due to the power supplies of different voltages for CPU, memory and hard disk drive, the DC-to-DC converter is required to regulate the power source voltage of the computer system to various supply voltages supplied to various operational units of the computer system.

Typically, a DC-to-DC converter modulates the duty cycle of an output stage by a driving signal, to thereby regulate the output voltage of the converter within a demanded range. In a conventional DC-to-DC converter, the output voltage of the converter is detected to generate a feedback signal, which feedback signal is compared with a threshold signal by an error amplifier to generate an error signal for a pulse width modulation (PWM) comparator to compare with a ramp signal to generate a PWM signal, and the PWM signal is supplied to a driver to drive the output stage. In this converter, an oscillator is generally employed to generate the ramp signal for the PWM comparator, so as to modulate the duty cycle of the PWM signal.

Alternatively, it is desired a DC-to-DC converter and method thereof based on a different operational principle.

SUMMARY OF THE INVENTION

One object of the present invention is to provide a DC-to-DC converter without PWM comparator and ramp signal generator, but employing charging principle to regulate the converter.

In a delta-sigma DC-to-DC converter, according to the present invention, a pair of low-side and high-side switches connected in series are switched by a pair of high-side and low-side driving signals to convert an input voltage to an output voltage, a sense circuit senses the output voltage to generate a feedback signal, a transconductive amplifier amplifies a difference between the feedback signal and a threshold signal to generate a differential current, a charging circuit is connected with the differential current to generate a charging voltage, and a driver compares the charging voltage with two reference signals to generate the pair of low-side and high-side driving signals.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
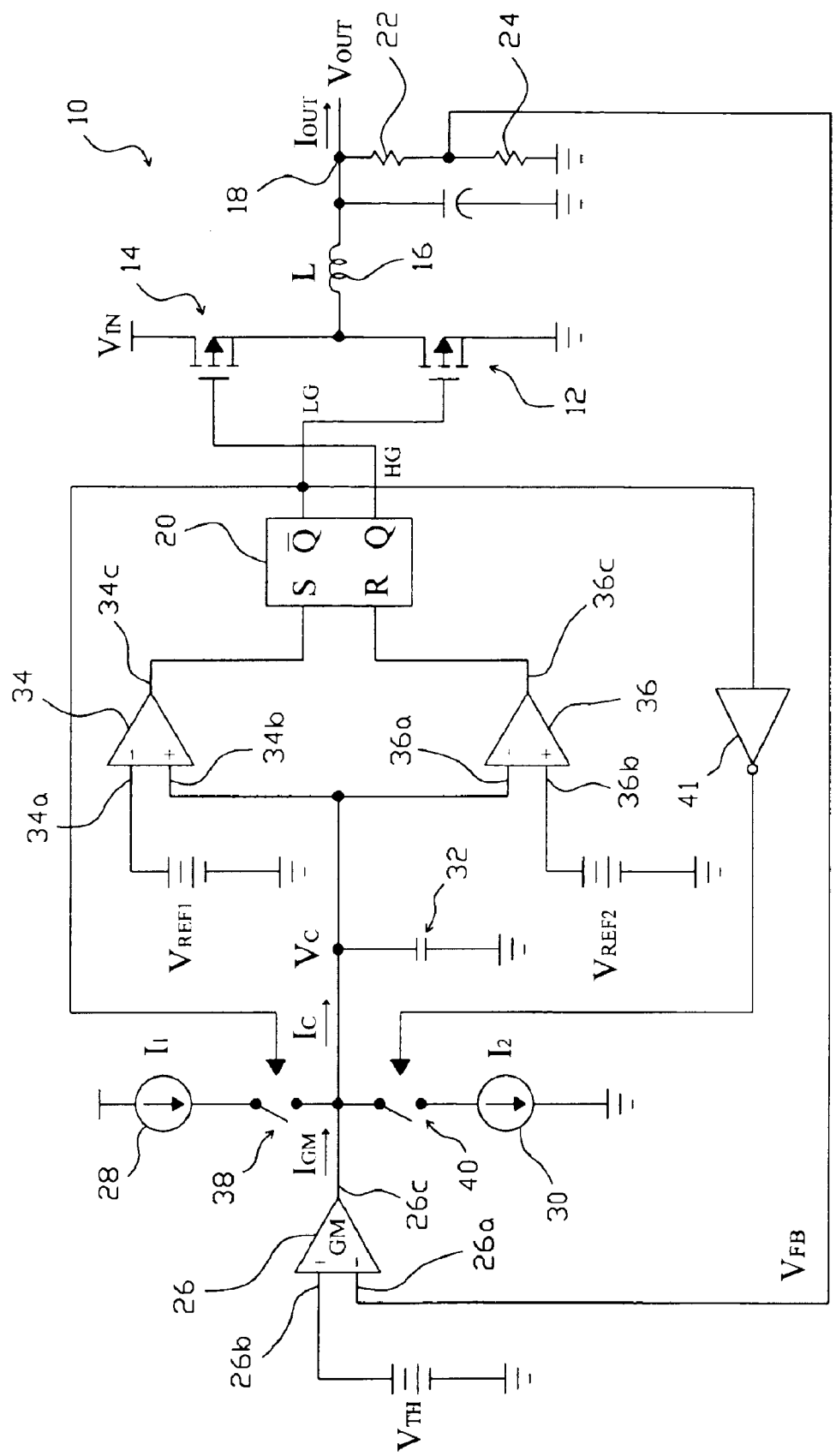
FIG. 1 shows a preferred delta-sigma DC-to-DC converter of the present invention.

FIG. 1 shows a preferred embodiment of the present invention. A delta-sigma DC-to-DC converter 10 comprises a pair of low-side NMOS 12 and high-side NMOS 14 connected in series as the output stage of the converter 10, of which the source of the low-side NMOS 12 is grounded, the drain of the low-side NMOS 12 is connected to the converter output 18 through an inductor 16, the source of the high-side NMOS 14 is connected to the converter output 18 through the inductor 16, the drain of the high-side NMOS 14 is connected with an input voltage $V_{IN}$, and the gates of the low-side NMOS 12 and high-side NMOS 14 are connected with low-side driving signal LG and high-side driving signal HG, respectively, to switch the low-side NMOS 12 and high-side NMOS 14 on and off to thereby generate an output current $I_{OUT}$ through the inductor 16 and an output voltage $V_{OUT}$ on the converter output 18 for a load. The output voltage $V_{OUT}$ is sensed by a sense circuit, including resistors 22 and 24 connected between the converter output 18 and ground as a voltage divider to divide the output voltage $V_{OUT}$, to generate a feedback signal $V_{FB}$. A transconductive amplifier 26 having an inverting input 26a connected with the feedback signal $V_{FB}$ and a non-inverting input 26b connected with a threshold signal $V_{TH}$, amplifies the difference between the feedback signal $V_{FB}$ and threshold signal $V_{TH}$ to generate a differential current $I_{GM}$ on its output 26c. A charging circuit includes a capacitor 32 connected to the output 26c of the transconductive amplifier 26, and a current source 28 and a current sink 30 controlled by the low-side driving signal LG and its inverse, respectively, to switch them to connect to the capacitor 32. Accordingly, the transconductive amplifier 26, current source 28 and current sink 30 determine a charging current $I_C$ to charge the capacitor 32 to thereby generate a charging voltage $V_C$. The current source 28 sources a current $I_1$ to the capacitor 32, and the current sink 30 sinks a current $I_2$ from the capacitor 32. As a result, the total charging current to charge the capacitor 32 is $$I_C = I_{GM} + I_1 - I_2, \quad (EQ-1)$$

and from which, it is obvious to those skilled in the art that the charging rate of the capacitor 32 or the slew rate of the charging voltage $V_C$ can be controlled by controlling the currents $I_{GM}$, $I_1$ and $I_2$ to determine the charging current $I_C$.

To generate the driving signals LG and HG, comparators 34 and 36 and an SR flip-flop 20 are configured to be a driver, of which the comparator 34 has its inverting input 34a and non-inverting input 34b connected with a reference signal $V_{REF1}$ and the charging voltage $V_C$, respectively, and its output 34c connected to the input S of the SR flip-flop 20, and the comparator 36 has its inverting input 36a and non-inverting input 36b connected with the charging voltage $V_C$ and a reference signal $V_{REF2}$, respectively, and its output 36c connected to the input R of the SR flip-flop 20. The comparator 34 compares the charging voltage $V_C$ with the reference voltage $V_{REF1}$ to generate a first comparator signal on its output 34c supplied to the input S of the SR flip-flop 20, and the comparator 36 compares the charging voltage $V_C$ with the reference voltage $V_{REF2}$ to generate a second comparator signal on its output 36c supplied to the input R of the SR flip-flop 20, by which the pair of complementary outputs Q and $\overline{Q}$ of the SR flip-flop 20 are generated and determine the low-side and high-side driving signals LG and HG. The complementary outputs Q and $\overline{Q}$ of the SR flip-flop 20 are connected to the gates of the high-side and low-side NMOSes 14 and 12. When the first comparator signal 34c and the second comparator signal 36c push the SR flip-flop 20 to have its output Q to a high-level and its complementary output $\overline{Q}$ to a low-level, the high-side NMOS 14 is turned on and the low-side NMOS 12 is turned off. On the contrary, when the first comparator signal 34c and the second comparator signal 36c push the SR flip-flop 20 to have its output Q to a low-level and its complementary output $\overline{Q}$ to a high-level, the high-side NMOS 14 is turned off and the low-side NMOS 12 is turned on. By this manner, the duty cycles of the pair of low-side NMOS 12 and high-side NMOS 14 are controlled by the driving signals LG and HG.

The converter 10 further comprises a switch 38 connected between the current source 28 and the capacitor 32 and a switch 40 connected between the current sink 30 and the capacitor 32, and the switches 38 and 40 are controlled by the low-side driving signal LG and its inverse through an inverter 41. When the output $\overline{Q}$ of the SR flip-flop 20 is a high-level voltage, the switch 38 is turned on and the switch 40 is turned off, thereby increasing the charging current $I_C$ flowing to the capacitor 32 and increasing the charging voltage $V_C$. When the output $\overline{Q}$ of the SR flip-flop 20 is a low-level voltage, the switch 38 is turned off and the switch 40 is turned on, thereby discharging the capacitor 32 and decreasing the charging voltage $V_C$.

The converter 10 has three operational modes set up by the transconductive amplifier 26. Under the delta-sigma mode, the differential current IGM flows from the capacitor 32 into the amplifier 26, i.e., the amplifier 26 has current sinking capability, and the converter 10 modulates the duty cycle of the high-side NMOS 14 and low-side NMOS 12 by the difference between the feedback signal $V_{FB}$ and threshold signal $V_{TH}$. Under the hysteresis mode, the differential current $I_{GM}$ is able to flow into or out from the amplifier 26, i.e., the amplifier 26 is capable of sinking or sourcing current, and the converter 10 modulates the output voltage $V_{OUT}$ within a demanded range. Under the valley mode, the differential current $I_{GM}$ flows out from the amplifier 26 to the capacitor 32, i.e., the amplifier 26 is sourcing current, and the converter 10 maintains the output voltage $V_{OUT}$ at a low level.

According to equation EQ-1, under the three operational modes, the value of the differential current $I_{GM}$ influences the value of the charging current $I_C$. Under the delta-sigma mode, the amplifier 10 is sinking current, and the current $I_{GM}$ flows into the amplifier 26, thereby the magnitude of the current $I_1$ equal to the sum of the magnitudes of the charging current $I_C$, current $I_2$ and differential current $I_{GM}$, i.e., $$|I_C|+|I_2|+|I_{GM}|=|I_1| \tag{EQ-2}$$

Under the hysteresis mode, the amplifier 26 is sinking or sourcing current, and therefore, the differential current $I_{GM}$ changes the charging current $I_C$ by sinking therefrom or sourcing thereto following equation EQ-1. Under the valley mode, the amplifier 26 is sourcing current, and the differential current $I_{GM}$ thus flows out from the amplifier 26, thereby the sum of the magnitudes of the differential currents $I_{GM}$ and sourcing $I_1$ equal to the sum of the magnitudes of the charging current $I_C$ and sinking current $I_2$.

For a typical application, the currents $I_1$ and $I_2$ of the current source 28 and current sink 30 of the converter 10 have a ratio therebetween proportional to the ratio of the input voltage $V_{IN}$ to the output voltages $V_{OUT}$.

Figure 2:
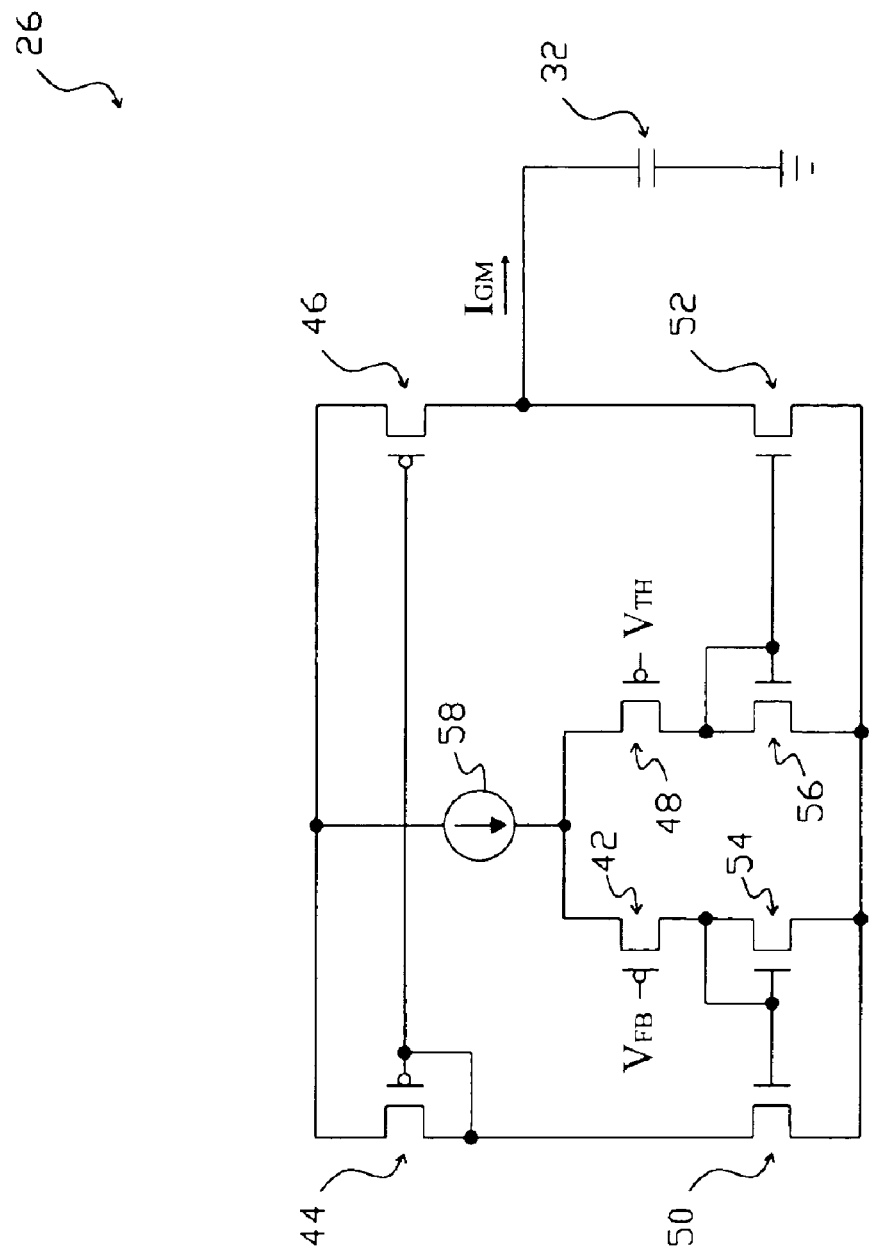
FIG. 2 shows an embodiment for the transconductive amplifier 26 of the converter 10 shown in FIG. 1.

FIG. 2 shows an embodiment for the transconductive amplifier 26 of the converter 10 shown in FIG. 1, which comprises PMOSes 42, 44, 46 and 48, NMOSes 50, 52, 54 and 56 and 218 and a current source 58. The source of the PMOS 42 is connected to the source of the PMOS 48, the drain of the PMOS 42 is connected to the drain and gate of the NMOS 54, the drain of the PMOS 48 is connected to the drain and gate of the NMOS 56, the source of the PMOS 44 is connected to the source of the PMOS 46, the gate and drain of the PMOS 44 are connected to the gate of the PMOS 46, the drain of the PMOS 44 is connected to the drain of the NMOS 50, the drain of the PMOS 46 is connected to the drain of the NMOS 52, the gate of the NMOS 50 is connected to the gate of the NMOS 54, the gate of the NMOS 52 is connected to the gate of the NMOS 56, the sources of the NMOSes 50, 52, 54 and 56 are grounded, the current source 58 is connected between the sources of the PMOSes 42 and 44, the gate of the PMOS 42 is connected with the feedback signal $V_{FB}$, the gate of the PMOS 48 is connected with the threshold signal $V_{TH}$, and the drains of the PMOS 46 and NMOS 52 are connected to the capacitor 32. The three operational modes, delta-sigma mode, hysteresis mode and valley mode, of the converter 10 are determined by the type of the transconductive amplifier 26. The circuit shown in FIG. 2 is the transconductive amplifier 26 for the converter 10 under the hysteresis mode, and by which, when the threshold signal $V_{TH}$ is larger than the feedback signal $V_{FB}$, the PMOS 46 is turned on and generates a differential current $I_{GM}$ flowing to the capacitor 32, and contrarily, when the threshold signal $V_{TH}$ is smaller than the feedback voltage $V_{FB}$, the NMOS 52 is turned on and sinks a differential current $I_{GM}$ flowing from the capacitor 32 to the transconductive amplifier 26. Therefore, the transconductive amplifier 26 shown in FIG. 2 under the hysteresis mode is capable of sinking and sourcing current. The transconductive amplifier 26 under the delta-sigma mode is that circuit shown in FIG. 2 but without the PMOS 46 and is only capable of sinking current. The transconductive amplifier 26 under the valley mode is that circuit shown in FIG. 2 but without the NMOS 52 and is only capable of sourcing current.

The larger the difference between the threshold signal $V_{TH}$ and feedback signal $V_{FB}$ is, the larger the duty cycle of the high-side NMOS 14 is, and vise versa. Under the delta-sigma mode, the duty cycles of the high-side NMOS 14 and low-side NMOS 12 are modulated in response to the difference between the threshold signal $V_{TH}$ and feedback signal $V_{FB}$, thereby controlling the output voltage $V_{OUT}$ within a demanded range.

Figure 3:
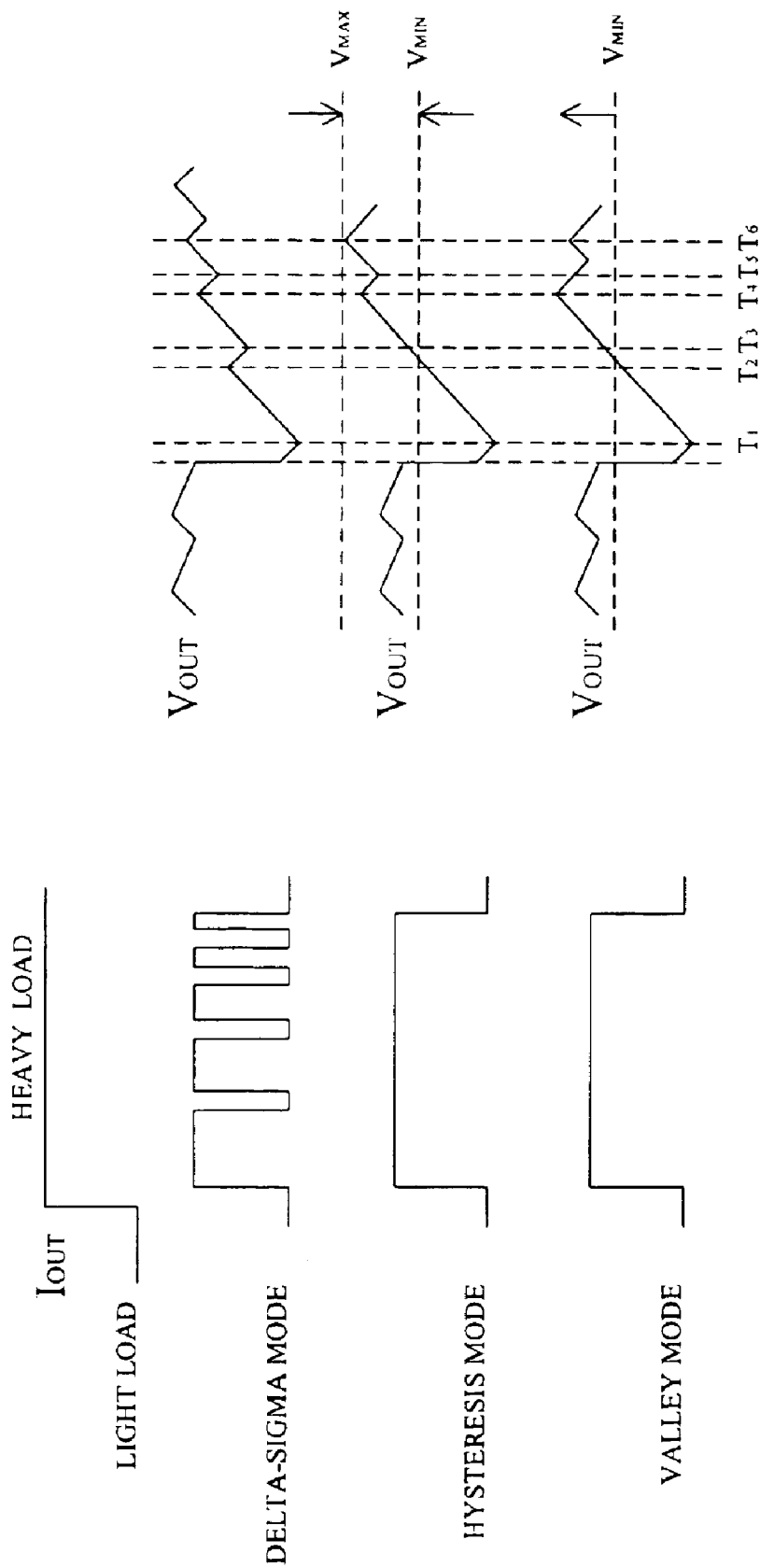
FIG. 3 shows waveforms of the output voltage of the converter 10 shown in FIG. 1 when loaded under three operational modes.

FIG. 3 shows waveforms of the output voltage $V_{OUT}$ of the converter 10 shown in FIG. 1 when loaded under three operational modes. When the output current $I_{OUT}$ is changed from light load to heavy load, the output voltage $V_{OUT}$ drops rapidly and continues to go down until time T1. In the delta-sigma mode, the converter 10 regulates the duty cycle of the high-side and low-side NMOS 14 and 12 according to the enlarged difference between the threshold signal $V_{TH}$ and feedback signal $V_{FB}$ by the amplification of the transconductive amplifier 26 when the output voltage $V_{OUT}$ decreasing. Due to the dropped output voltage, the magnitude of the differential current $I_{GM}$ generated by the transconductive amplifier 26 is increased, whereby enhancing the current sinking capability of the transconductive amplifier 26. From equation EQ-2, the charging current $I_C$ flowing to the capacitor 32 is decreased, causing the charging voltage $V_C$ dropped, thereby extending the time period of the first and second comparator signals 34c and 36c to change state, resulting in larger duty cycles of the driving signals HG and LG. On the contrary, the smaller the difference between the threshold signal $V_{TH}$ and feedback signal $V_{FB}$ is, the smaller the duty cycles of the driving signals HG and LG are. As shown in FIG. 3, when the output voltage $V_{OUT}$ begins to be recovered toward the original value, the duty cycles of the driving signals HG and LG are decreased gradually. Therefore, by responding to the difference between the threshold signal $V_{TH}$ and feedback signal $V_{FB}$ to regulate the duty cycles of the driving signals HG and LG, the output voltage $V_{OUT}$ is maintained within a demand range.

In the hysteresis mode, likewise, when the output current $I_{OUT}$ is changed from light load to heavy load, the output voltage $V_{OUT}$ drops rapidly and continues to go down until time T1. However, the transconductive amplifier 26 in this mode is capable of sourcing and sinking current, thus the converter 10 will have the maximum duty cycle, i.e., turns on the high-side NMOS 14 as long as possible, thereby pulling the output voltage $V_{OUT}$ up rapidly and maintaining it between the highest voltage $V_{MAX}$ and lowest voltage $V_{MIN}$. When the output voltage $V_{OUT}$ is lower than the predetermined lowest level $V_{MIN}$, the transconductive amplifier 26 is sourcing current to increase the charging voltage $V_C$ and thus to increase the duty cycle of the high-side NMOS 14, thereby having the output voltage $V_{OUT}$ raising up to higher than the lowest voltage $V_{MIN}$. On the contrary, when the output voltage $V_{OUT}$ is higher than the predetermined highest level $V_{MAX}$, the transconductive amplifier 26 is sinking current to increase the charging voltage $V_C$ and thus to decrease the duty cycle of the high-side NMOS 14, thereby having the output voltage $V_{OUT}$ falling down to lower than the highest voltage $V_{MAX}$.

In the valley mode, the output voltage $V_{OUT}$ is to be maintained not lower than the lowest voltage $V_{MIN}$. When the output current $I_{OUT}$ is changed from light load to heavy load, the output voltage $V_{OUT}$ drops rapidly and continues to go down until time T1, and the sense circuit composed of the resistors 22 and 24 senses the change of the output voltage $V_{OUT}$ to accordingly generate the feedback signal $V_{FB}$. The transconductive amplifier 26 is capable of only sourcing current in this mode, and during the load transient period, it amplifies the difference between the threshold signal $V_{TH}$ and feedback signal $V_{FB}$, by increasing the differential current $I_{GM}$ from the amplifier output 26c to increase the charging voltage $V_C$, to have the SR flip-flop 20 generating a driving signal to turn on the high-side NMOS 14, thereby pulling the output voltage $V_{OUT}$ over the predetermined lowest level.

The converter of the present invention employs charging circuit and typical transconductive amplifier to control the output voltage within a demand range, which is principally different from the conventional converter that employs PWM comparator connected with ramp signal as the reference signal to regulate the output voltage within a demand range.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A delta-sigma DC-to-DC converter, comprising:
   a pair of high-side and low-side switches for being switched to convert an input voltage to an output voltage;
   a sense circuit for sensing said output voltage to generate a feedback signal;
   a transconductive amplifier for amplifying a difference between said feedback signal and a threshold signal to generate a differential current;
   a charging circuit connected with said differential current for generating a charging voltage; and
   a driver for generating a pair of high-side and low-side driving signals by comparing said charging voltage with a first and second reference signals to drive said pair of high-side and low-side switches.

2. The converter according to claim 1, wherein said charging current comprises:
   a charging node connected with said differential current;
   a capacitor connected to said charging node for generating said charging voltage by charged thereto; and
   a pair of current source and current sink controlled by one of said pair of high-side and low-side driving signals to be connected to said capacitor.

3. The converter according to claim 1, wherein said driver comprises:
   a first comparator for generating a first comparator signal by comparing said charging voltage with said first reference signal;
   a second comparator for generating a second comparator signal by comparing said charging voltage with said second reference signal; and
   a flip-flop for receiving said first and second comparator signals to generate said pair of high-side and low-side driving signals.

4. The converter according to claim 1, wherein said differential current flows into said transconductive amplifier under a delta-sigma mode.

5. The converter according to claim 1, wherein said differential current flows into or out from said transconductive amplifier under a hysteresis mode.

6. The converter according to claim 1, wherein said differential current flows out from said transconductive amplifier under a valley mode.

7. The converter according to claim 2, wherein said pair of current source and current sink have a current ratio proportional to a voltage ratio of said input and output voltages.

8. The converter according to claim 3, wherein said flip-flop comprises an SR flip-flop.

9. A method for converting a DC input voltage to a DC output voltage, said method comprising the steps of:
   switching a pair of high-side and low-side switches for being switched by a pair of high-side and low-side driving signals to convert said input voltage to said output voltage;
   sensing said output voltage for generating a feedback signal;
   amplifying a difference between said feedback signal and a threshold signal for generating a differential current;
   generating a charging voltage including using said differential current; and
   comparing said charging voltage with a first and second reference signals for generating said pair of high-side and low-side driving signals.

10. The method according to claim 9, wherein the step of generating a charging voltage comprises the steps of:
    charging a capacitor by said differential current; and
    switching a pair of current source and current sink controlled by one of said pair of high-side and low-side driving signals to be connected to said capacitor.

11. The method according to claim 9, wherein the step of comparing said charging voltage with a first and second reference signals comprises the steps of:
    comparing said charging voltage with said first reference signal for generating a first comparator signal;
    comparing said charging voltage with said second reference signal for generating a second comparator signal; and
    generating said pair of high-side and low-side driving signals by connecting said first and second comparator signals to a flip-flop.

* * * * *